US012683192B2

(12) United States Patent
Cho et al.

(10) Patent No.: US 12,683,192 B2
(45) Date of Patent: Jul. 14, 2026

(54) ELECTROLYTIC SOLUTION AND NON-AQUEOUS ELECTROLYTIC SOLUTION SECONDARY BATTERY

(71) Applicant: SEKISUI CHEMICAL CO., LTD., Osaka (JP)

(72) Inventors: Taehyung Cho, Osaka (JP); Ryousuke Takahashi, Osaka (JP); Tsutomu Ando, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 534 days.

(21) Appl. No.: 18/269,052

(22) PCT Filed: Dec. 22, 2021

(86) PCT No.: PCT/JP2021/047521

§ 371 (c)(1),
(2) Date: Jun. 22, 2023

(87) PCT Pub. No.: WO2022/138705

PCT Pub. Date: Jun. 30, 2022

(65) Prior Publication Data

US 2024/0304861 A1 Sep. 12, 2024

(30) Foreign Application Priority Data

Dec. 24, 2020 (JP) ................................. 2020-215379

(51) Int. Cl.
| | |
|---|---|
| *H01M 4/66* | (2006.01) |
| *H01M 10/0525* | (2010.01) |
| *H01M 10/0567* | (2010.01) |

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025; H01M 10/0569; H01M 10/052; H01M 2300/004; Y02E 60/10
See application file for complete search history.

(56) References Cited

U.S. PATENT DOCUMENTS

| | | | |
|---|---|---|---|
| 2007/0224514 A1* | 9/2007 | Kotato | .............. H01M 10/0567 429/325 |
| 2010/0081062 A1 | 4/2010 | Chiga et al. | |
| 2015/0235772 A1 | 8/2015 | Sakata et al. | |
| 2020/0176771 A1* | 6/2020 | Tani | ...................... H01M 4/525 |
| 2020/0274199 A1 | 8/2020 | Watarai et al. | |

FOREIGN PATENT DOCUMENTS

| | | |
|---|---|---|
| CN | 101617432 | 12/2009 |
| CN | 111344891 | 6/2020 |
| CN | 109119598 | 9/2021 |
| JP | 1-122566 | 5/1989 |
| JP | 7-509343 | 10/1995 |
| JP | 10-270075 | 10/1998 |
| JP | 2004-234877 | 8/2004 |
| JP | 2005-50585 | 2/2005 |
| JP | 2011-86391 | 4/2011 |
| JP | 2014-72102 | 4/2014 |
| KR | 10-0467430 | 1/2005 |
| WO | 94/02662 | 2/1994 |
| WO | 2014/050877 | 4/2014 |
| WO | 2019/065196 | 4/2019 |

OTHER PUBLICATIONS

International Search Report issued Mar. 29, 2022 in corresponding International (PCT) Application No. PCT/JP2021/047521.

* cited by examiner

*Primary Examiner* — Daniel H Lee
(74) *Attorney, Agent, or Firm* — Wenderoth, Lind & Ponack, L.L.P.

(57) ABSTRACT

The present invention provides an electrolytic solution that is less likely to cause a decrease in discharge capacity even under high-current conditions and enables high capacity retention, and a non-aqueous electrolytic solution secondary battery including the electrolytic solution. Provided is an electrolytic solution containing a carboxylic acid ester; and a hydroxy group-containing compound and/or an ether group-containing compound, the electrolytic solution containing the hydroxy group-containing compound and/or the ether group-containing compound in an amount of 50 mass ppm or less.

5 Claims, No Drawings

ELECTROLYTIC SOLUTION AND NON-AQUEOUS ELECTROLYTIC SOLUTION SECONDARY BATTERY

TECHNICAL FIELD

The present invention relates to an electrolytic solution and a non-aqueous electrolytic solution secondary battery including the electrolytic solution.

BACKGROUND ART

With the rapid expansion of the market of laptop computers, mobile phones, and electric vehicles, etc., high energy density secondary batteries are needed. Lithium secondary batteries with high electromotive force that use non-aqueous electrolytic solutions, which contain solutes dissolved in non-aqueous solvents, and utilize lithium oxidation and reduction, have been used as new secondary batteries with high energy density.

CITATION LIST

Patent Literature

Patent Literature 1: JP 2005-50585 A

SUMMARY OF INVENTION

Technical Problem

However, conventional lithium secondary batteries may not have sufficient storage properties because the negative electrode reacts with the non-aqueous electrolytic solution during storage in a charged state.

Especially in recent years, the above lithium secondary batteries have been used as, for example, power sources for memory backup in electronic devices such as mobile phones. Such lithium secondary batteries are exposed to high temperature, resulting in a greater decrease in storage properties.

In response to this, for example, Patent Literature 1 discloses a method of adding at least one additive compound selected from an alcohol, an aldehyde, and a carboxylic acid ester to a non-aqueous electrolytic solution.

However, adding the additive compound of Patent Literature 1 may cause the discharge capacity of the secondary battery to decrease as the current value increases. Especially at high current values, the capacity retention may significantly decrease.

The present invention aims to provide an electrolytic solution that is less likely to cause a decrease in discharge capacity even under high-current conditions and enables high capacity retention, and a non-aqueous electrolytic solution secondary battery including the electrolytic solution.

Solution to Problem

The present invention relates to an electrolytic solution containing a carboxylic acid ester; and a hydroxy group-containing compound and/or an ether group-containing compound, the electrolytic solution containing the hydroxy group-containing compound and/or the ether group-containing compound in an amount of 50 mass ppm or less.

The present invention is described in detail below.

As a result of intensive studies, the present inventors have found out that adding a predetermined amount of a compound having a predetermined functional group to a carboxylic acid ester can provide an electrolytic solution that is less likely to cause a decrease in discharge capacity even under high-current conditions and enables high capacity retention. The inventors thus completed the present invention.

The electrolytic solution that is an embodiment of the present invention contains a carboxylic acid ester. The electrolytic solution, having the feature that it contains a carboxylic acid ester, enables high capacity retention not only at room temperature but also at low temperature. The carboxylic acid ester is not limited, but preferably has a structure represented by the general formula R—COOR' wherein R represents a hydrogen atom or a C1-C10 linear or branched hydrocarbon group, and R' represents a C1-C10 linear or branched hydrocarbon group.

R and R' are each more preferably a linear alkyl group. One carboxylic acid ester or a mixture of two or more carboxylic acid esters may be used.

R and R' each preferably have a carbon number of 1 or greater and 8 or less, more preferably 5 or less, still more preferably 3 or less, particularly preferably 2 or less.

Examples of the carboxylic acid ester include: saturated aliphatic carboxylic acid esters such as formic acid esters, acetic acid esters, propionic acid esters, and butanoic acid esters; and unsaturated aliphatic carboxylic acid esters such as acrylic acid esters, methacrylic acid esters, and maleic acid esters. Of these, acetic acid esters and propionic acid esters are preferred, methyl acetate and methyl propionate are more preferred, and methyl acetate is still more preferred.

The amount of the carboxylic acid ester in the electrolytic solution is preferably 3% by mass or greater and 40% by mass or less. When the amount of the carboxylic acid ester is 3% by mass or greater, the viscosity of the electrolytic solution can be decreased and the mobility of lithium ions in the electrolytic solution can be increased. When the amount of the carboxylic acid ester is 40% by mass or less, stable charge and discharge can be achieved without disturbing the solvation in the electrolytic solution. The amount of the carboxylic acid ester is more preferably 4% by mass or greater and 35% by mass or less, still more preferably 6% by mass or greater and 30% by mass or less, further preferably 8% by mass or greater and 25% by mass or less, particularly preferably 10% by mass or greater and 20% by mass or less.

The carboxylic acid ester in the electrolytic solution preferably has a boiling point of 35° C. or higher and 90° C. or lower, more preferably 40° C. or higher and 80° C. or lower, still more preferably 50° C. or higher and 70° C. or lower. When the boiling point of the carboxylic acid ester in the electrolytic solution is within the above range, the electrolytic solution can have a reduced viscosity, enabling higher capacity retention under high-current conditions. When the boiling point of the carboxylic acid ester in the electrolytic solution is not lower than the lower limit of the above range, the electrolytic solution can have a high flash point, leading to improved thermal safety.

The boiling point can be measured under atmospheric pressure using a commercial boiling point measuring device, such as FP81HT/FP81C (produced by Mettler-Toledo). The boiling point is described in documents such as "CRC Handbook of Chemistry and Physics" and "Aldrich Handbook of Fine Chemical and Laboratory Equipment", for example.

The carboxylic acid ester in the electrolytic solution preferably has a melting point of −50° C. or lower, more preferably −70° C. or lower, still more preferably −80° C. or lower, further preferably −90° C. or lower. The lower limit of the melting point is not limited, but may be −130° C. or higher or −110° C. or higher, for example. When the melting point of the carboxylic acid ester in the electrolytic solution is within the above range, the viscosity of the electrolytic solution is less likely to increase even in environments at or below freezing point, enabling high capacity retention even in use in environments at or below freezing point, i.e., cold climate areas. The melting point can be measured using a differential scanning calorimeter (DSC6220, produced by Seiko Instruments Inc.), for example. For measurement, first, 10 mg of a sample is placed in an aluminum pan and subjected to differential scanning calorimetry (DSC) using a differential scanning calorimeter (DSC6220, produced by Seiko Instruments Inc.). The measurement conditions are set to cool and heat the measurement sample between −130° C. and 50° C. at 2° C./min. After reaching the set temperature (−130° C. or 50° C.), the sample is held at the set temperature for three minutes. The first peak observed in cooling is determined as the melting point. The melting point can be determined as the average by performing three cycles of measurement and using the data of the last two cycles.

The electrolytic solution that is an embodiment of the present invention contains a hydroxy group-containing compound and/or an ether group-containing compound. The electrolytic solution, having the feature that it contains the compound(s), is less likely to cause a decrease in discharge capacity even under high-current conditions and enables high capacity retention.

In the electrolytic solution that is an embodiment of the present invention, the amount of the hydroxy group-containing compound and/or the ether group-containing compound is 50 mass ppm or less. When the amount is 50 mass ppm or less, the discharge capacity is less likely to decrease even under high-current conditions, enabling high capacity retention.

The amount of the hydroxy group-containing compound and/or the ether group-containing compound is preferably 1 mass ppm or greater and 40 mass ppm or less, more preferably 1.2 mass ppm or greater and 35 mass ppm or less, still more preferably 1.5 mass ppm or greater and 30 mass ppm or less. The amount of the hydroxy group-containing compound and/or the ether group-containing compound is further preferably 1.7 mass ppm or greater and 25 mass ppm or less, particularly preferably 2 mass ppm or greater and mass ppm or less.

Herein, when only one of the hydroxy group-containing compound and the ether group-containing compound is contained, the "amount of the hydroxy group-containing compound and/or the ether group-containing compound" means the amount of the contained compound only, and when both the hydroxy group-containing compound and the ether group-containing compound are contained, it means the total amount of both.

The "amount of the hydroxy group-containing compound and/or the ether group-containing compound" can be measured by gas chromatography (GC), for example. The amount can be measured by directly measuring the amount in the electrolytic solution, or by measuring the amount of the hydroxy group-containing compound and/or the ether group-containing compound in a specific raw material and then calculating the amount of the hydroxy group-containing compound and/or the ether group-containing compound in the electrolytic solution from the proportion of the raw material to other components.

The hydroxy group-containing compound may be, for example, at least one selected from the group consisting of a primary alcohol, a secondary alcohol, and a tertiary alcohol. From the standpoint of oxidizing power, primary alcohols are preferred. The hydroxy group-containing compound used may be a polyalcohol such as a dihydric alcohol or a trihydric alcohol.

The hydroxy group-containing compound preferably has a carbon number of 1 or greater and 10 or less, more preferably 8 or less, still more preferably 5 or less, further preferably 3 or less, particularly preferably 2 or less.

One of these hydroxy group-containing compounds may be used, or two or more of them may be used in combination. The hydroxy group-containing compound may be linear or branched. The hydroxy group-containing compound may have one, two, or three or more hydroxy groups.

The hydroxy group-containing compound can be represented by the general formula $R\text{—}(OH)_n$ (wherein R is a hydrocarbon group that may contain a substituent, and n is an integer of 1 or greater). In particular, the hydroxy group-containing compound is preferably represented by the general formula R—OH (wherein R is a hydrocarbon group that may contain a substituent).

Examples of the primary alcohol include methanol, ethanol, 1-propanol, 1-butanol, 1-petanol, 1-hexanol, 1-heptanol, and 1-octanol. Preferred among these is methanol.

Examples of the secondary alcohol include isopropanol, 2-butanol, cyclopetanol, and cyclohexanol.

Examples of the tertiary alcohol include 1-adamantanol, tert-butanol, and tert-amyl alcohol.

In the electrolytic solution that is an embodiment of the present invention, the amount of the hydroxy group-containing compound is preferably 1 mass ppm or greater and mass ppm or less. When the amount is within the above range, an electrolytic solution that enables higher capacity retention can be provided. This is considered to be because the hydroxy group-containing compound in such an amount allows the formation of a stable SEI (solid electrolyte interphase) film on the surface of the negative electrode.

The amount of the hydroxy group-containing compound is more preferably 1.2 mass ppm or greater and 35 mass ppm or less, still more preferably 1.5 mass ppm or greater and mass ppm or less, further preferably 1.7 mass ppm or greater and 25 mass ppm or less, particularly preferably 2 mass ppm or greater and 20 mass ppm or less.

Examples of the ether group-containing compound include monoether compounds, diether compounds, and triether compounds. Preferred among these are diether compounds.

The ether group-containing compound used may be an acyclic ether compound or a cyclic ether compound.

The ether group-containing compound preferably has a carbon number of 2 or greater and 10 or less, more preferably 3 or greater and 8 or less, still more preferably 4 or greater and 6 or less.

One of these ether group-containing compounds may be used, or two or more of them may be used in combination.

The ether group-containing compound preferably has a boiling point of −30° C. or higher and 150° C. or lower, more preferably −10° C. or higher and 120° C. or lower, still more preferably 10° C. or higher and 90° C. or lower, further preferably 30° C. or higher and 70° C. or lower.

Examples of the monoether compounds include dialkyl ethers such as dimethyl ether, diethyl ether, diisopropyl ether, and dibutyl ether, and monoether compounds of polyalkylene glycols.

Examples of the diether compounds include dimethoxymethane, methoxyethoxymethane, diethoxymethane, 1,1-dimethoxyethane, 1,2-dimethoxyethane, methoxyethoxyethane, diethoxyethane, ethylene glycol di-n-propyl ether, and ethylene glycol di-n-butyl ether. Preferred among these is 1,1-dimethoxyethane.

Examples of the triether compounds include trialkyl ethers of trihydric alcohols. The ether group-containing compound preferably has a structure in which multiple ether groups bind to the same carbon.

In the electrolytic solution that is an embodiment of the present invention, the amount of the ether group-containing compound is preferably 1 mass ppm or greater and mass ppm or less. When the amount is within the above range, an electrolytic solution that enables higher capacity retention can be provided. This is considered to be because the ether group-containing compound in such an amount allows the formation of a stable SEI (solid electrolyte interphase) film on the surface of the negative electrode.

The amount of the ether group-containing compound is more preferably 1.2 mass ppm or greater and 35 mass ppm or less, still more preferably 1.5 mass ppm or greater and 30 mass ppm or less, further preferably 1.7 mass ppm or greater and 25 mass ppm or less, particularly preferably 2 mass ppm or greater and 20 mass ppm or less.

The electrolytic solution preferably has a mass ratio of the hydroxy group-containing compound to the ether group-containing compound (amount of hydroxy group-containing compound/amount of ether group-containing compound) of 0.1 or greater and 10 or less. When the ratio is within the range, an electrolytic solution that enables higher capacity retention can be provided. While not intending to be bound by any particular theory, this is considered to be because such a mass ratio allows the formation, on the surface of the negative electrode, of a SEI film that allows easy insertion and desorption of lithium ions.

The mass ratio is more preferably 0.12 or greater and 8 or less, still more preferably 0.15 or greater and 5 or less, further preferably 0.17 or greater and 3 or less, particularly preferably 0.2 or greater and 2 or less, more particularly preferably 0.25 or greater and 1 or less.

The solvent used for the electrolytic solution can be a nonaqueous solvent. Examples of the nonaqueous solvent include an organic solvent.

The organic solvent may be any aprotic solvent. Examples thereof include carbonates, esters, ethers, lactones, nitriles, amides, and sulfones. Specific examples include propylene carbonate, ethylene carbonate, diethyl carbonate, dimethyl carbonate, ethyl methyl carbonate, dimethoxyethane, acetonitrile, propionitrile, tetrahydrofuran, 2-methyltetrahydrofuran, dioxane, nitromethane, N,N-dimethylformamide, dimethylsulfoxide, sulfolane, and γ-butyrolactone. Preferred among these from the standpoint of ion conductivity are propylene carbonate, ethylene carbonate, diethyl carbonate, dimethyl carbonate, and ethyl methyl carbonate. The solvent more preferably contains ethylene carbonate from the standpoint of salt dissociation properties. One of the solvents may be used, or two or more of them may be used.

In particular, a carbonate (carbonic acid ester) is preferably used as the solvent, and a solvent mixture containing ethylene carbonate (EC), ethyl methyl carbonate (EMC), and diethyl carbonate (DEC) is more preferably used. When the solvent mixture is used, the mixing ratio by volume (EC:EMC:DEC) is preferably 2 to 4/2 to 4/2 to 6, more preferably 2.5 to 3.5/2.5 to 3.5/3 to 5, still more preferably 2.8 to 3.2/2.8 to 3.2/3.6 to 4.4, for example, 3:3:4.

The solvent is different from the carboxylic acid ester, ether group-containing compound, and hydroxy group-containing compound described above.

The electrolyte used for the electrolytic solution is not limited as long as the electrolytic solution of the present invention has the effects of the present invention. Examples thereof include metal ions or salts thereof. Preferred among these are metal ions of Group 1 or Group 2 of the periodic table or salts thereof. Specific examples include lithium salts, potassium salts, sodium salts, calcium salts, and magnesium salts. Preferred among these from the standpoint of the output are lithium salts.

The lithium salts are not limited. Examples thereof include lithium hexafluorophosphate (LiPF$_6$), lithium tetrafluoroborate (LiBF$_4$), lithium bis(trifluoromethylsulfonyl) imide (LiN(SO$_2$CF$_3$)$_2$), lithium bis(pentafluoroethylsulfonyl)imide (LiN(SO$_2$CF$_2$CF$_3$)$_2$), lithium perchlorate (LiClO$_4$), lithium trifluoromethanesulfonate (LiCF$_3$SO$_3$), lithium hexafluoroantimonate (LiSbF$_6$), lithium hexafluoroarsenate (LiAsF$_6$), lithium tetraphenylborate (LiB(C$_6$H$_5$)$_4$), LiC(SO$_2$CF$_3$)$_3$, LiPF$_4$(CF$_3$)$_2$, LiPF$_3$(CF$_3$)$_3$, LiPF$_3$(CF$_2$CF$_3$)$_3$, LiPF$_3$(CF(CF$_3$)CF$_3$)$_3$, and LiPF$_5$(CF(CF$_3$)CF$_3$). Preferred among these from the standpoint of ion conductivity is lithium hexafluorophosphate (LiPF$_6$).

One of the electrolytes or two or more of them may be used.

The electrolytic solution preferably has an electrolyte concentration of 0.005 to 5 mol/L, more preferably 0.01 to 4.5 mol/L, still more preferably 0.05 to 4 mol/L, further preferably 0.1 to 3.5 mol/L, particularly preferably 0.5 to 3 mol/L.

The electrolytic solution may contain additives in addition to the above-described components as long as the effects of the present invention are not impaired.

Examples of the additives include a gas generating agent (what is called an additive for overcharge protection), a solid electrolyte interphase (SEI) film forming agent, a halogen flame retardant, a phosphorous flame retardant, and other flame retardants.

Examples of the phosphorous flame retardant include phosphoric acid ester compounds such as trimethyl phosphate (TMP), triethyl phosphate (TEP), 2,2,2-trifluoroethyl phosphate (TFP), triphenyl phosphate (TPP), and tritolyl phosphate (TTP).

Preferably, the flame retardant used is a phosphoric acid ester compound described in GS Yuasa Technical Report (June 2005, vol. 2, No. 1, pp. 26 to 31).

The electrolytic solution can be obtained by mixing a carboxylic acid ester, a hydroxy group-containing compound and/or an ether group-containing compound, and optionally a solvent and an electrolyte. The order of addition is not limited. For example, the electrolytic solution can be prepared by adding a hydroxy group-containing compound and/or an ether group-containing compound to a carboxylic acid ester and then mixing them with a solvent and an electrolyte. Specifically, an electrolytic solution having an electrolyte concentration of 1 mol/L can be obtained by mixing a carboxylic acid ester and a hydroxy group-containing compound and/or an ether group-containing compound at a predetermined proportion to give a solution, adding a solvent to the solution, and then dissolving an electrolyte such as lithium hexafluorophosphate (LiPF$_6$) to a concentration of 1 mol/L.

In the electrolytic solution, with the constituent materials excluding the electrolyte taken as 100% by mass, the amount of the solvent is preferably 65 to 97% by mass, more preferably 70 to 96% by mass, still more preferably 75 to 95% by mass, further preferably 75 to 94% by mass, particularly preferably 75 to 90% by mass.

The amount of the carboxylic acid ester in the constituent materials excluding the electrolyte is preferably 3 to 35% by mass, more preferably 4 to 30% by mass, still more preferably 5 to 25% by mass, further preferably 6 to 25% by mass, particularly preferably 10 to 25% by mass.

The amount of the hydroxy group-containing compound and/or the ether group-containing compound in the constituent materials excluding the electrolyte is preferably 50 mass ppm or less, more preferably 1 to 47 mass ppm, still more preferably 2 to 43 mass ppm, further preferably 3 to 38 mass ppm, particularly preferably 3 to mass ppm, more particularly preferably 3 to 25 mass ppm.

The amount of the hydroxy group-containing compound in the constituent materials excluding the electrolyte is preferably 1 mass ppm or greater and 40 mass ppm or less, more preferably 1.2 mass ppm or greater and 35 mass ppm or less, still more preferably 1.5 mass ppm or greater and 30 mass ppm or less, further preferably 1.7 mass ppm or greater and 25 mass ppm or less, particularly preferably 2 mass ppm or greater and 20 mass ppm or less.

The amount of the ether group-containing compound in the constituent materials excluding the electrolyte is preferably 1 mass ppm or greater and 40 mass ppm or less, more preferably 1.2 mass ppm or greater and 35 mass ppm or less, still more preferably 1.5 mass ppm or greater and 30 mass ppm or less, further preferably 1.7 mass ppm or greater and 25 mass ppm or less, particularly preferably 2 mass ppm or greater and 20 mass ppm or less.

A non-aqueous electrolytic solution secondary battery can be obtained using a positive electrode, a negative electrode, a separator, and the like in addition to the electrolytic solution. Such a non-aqueous electrolytic solution secondary battery including the electrolytic solution is also encompassed by the present invention.

Examples of such a non-aqueous electrolytic solution secondary battery include lithium secondary batteries.

The non-aqueous electrolytic solution secondary battery that is another embodiment of the present invention can be prepared by a known method. For example, it can be produced in a glovebox or in a dry air atmosphere using the electrolytic solution, the positive electrode, the negative electrode, the separator, and the like.

The positive electrode at least contains a positive electrode active material. Examples of the positive electrode active material include $LiCoO_2$, $LiNiO_2$, $LiMnO_2$, $LiMn_2O_4$, $LiNi_{0.5}Mn_{0.3}Co_{0.2}O_2$, $LiNi_{0.8}Co_{0.15}Al_{0.05}O_2$, and $LiFePO_4$. The positive electrode may contain a conductive aid. Examples of the conductive aid include carbon black (CB) and acetylene black (AB). Examples of binders include polyvinylidene fluoride (PVdF).

The negative electrode at least contains a negative electrode active material. Examples of the negative electrode active material include graphite (e.g., artificial graphite), soft carbon, hard carbon, silicon, silicon oxide, silicon-based alloys, tin, tin oxide, and tin-based alloys. Examples of binders that may be used include PVdF, carboxymethyl cellulose (CMC), and styrene-butadiene rubber (SBR).

The separator used may be a porous film. The porous film may be made of polyethylene (PE) or polypropylene (PP).

The separator may be a single-layer structure or a multi-layer structure.

Advantageous Effects of Invention

The present invention can provide an electrolytic solution that is less likely to cause a decrease in discharge capacity even under high-current conditions and enables high capac-ity retention, and a non-aqueous electrolytic solution sec-ondary battery including the electrolytic solution.

DESCRIPTION OF EMBODIMENTS

The present invention is more specifically described in the following with reference to, but not limited to, examples.

Example 1

(Preparation of Carboxylic Acid Ester Composition)

First, methyl acetate (produced by Sigma-Aldrich) was provided and analyzed with a GC (produced by Shimadzu Corporation, GC-2010) to confirm that it did not contain a hydroxy group-containing compound ($R$—$(OH)_n$, wherein R is a hydrocarbon group that may contain a substituent and n is an integer of 1 or greater) or an ether group-containing compound.

Next, to the methyl acetate were added methanol in an amount of 23 mass ppm and 1,1-dimethoxyethane in an amount of 115 mass ppm, whereby a carboxylic acid ester composition was prepared. The amounts of methanol and 1,1-dimethoxyethane were measured using a GC (produced by Shimadzu Corporation, GC-2010).

(Preparation of Electrolytic Solution)

Lithium-ion battery-grade (LBG) ethylene carbonate (EC), LBG diethyl carbonate (DEC), and LBG lithium-ion battery-grade ethyl methyl carbonate (EMC) (produced by Kishida Chemical Co., Ltd.) were mixed at a volume ratio of 3:4:3 to prepare a solvent mixture.

Next, the obtained solvent mixture and the carboxylic acid ester composition obtained were mixed at a mass ratio of 9:1 to prepare an electrolytic solution solvent.

Then, lithium hexafluorophosphate ($LiPF_6$, produced by Kishida Chemical Co., Ltd.) was dissolved in the electro-lytic solution solvent to a salt concentration of 1 mol/L, whereby an electrolytic solution was prepared.

From the proportions of the carboxylic acid ester com-position, the solvent mixture, and the salt (electrolyte), the amounts of methyl acetate, methanol, and 1,1-dimethoxy-ethane in the electrolytic solution (the entire electrolytic solution) were calculated. The amounts of methyl acetate, methanol, and 1,1-dimethoxyethane in the constituent mate-rials excluding the electrolyte (excluding the electrolyte) was also calculated. The calculated amounts (the entire electrolytic solution) and the calculated amounts (excluding the electrolyte) are shown in Table 1.

(Preparation of Positive Electrode Active Material)

$LiNi_{0.5}Mn_{0.3}Co_{0.2}O_2$ as a positive electrode active mate-rial was prepared with reference to the method described in a non-patent literature (Journal of Power Sources, Vol. 146, pp. 636-639 (2005)).

Specifically, first, lithium hydroxide and a ternary hydrox-ide of nickel, manganese, and cobalt with a molar ratio of 5:3:2 were mixed to give a mixture. Next, this mixture was heated at 1,000° C. in an air atmosphere and granulated, whereby a positive electrode active material was prepared.

(Preparation of Positive Electrode)

An amount of 27.6 g of the obtained positive electrode active material ($LiNi_{0.5}Mn_{0.3}Co_{0.2}O_2$), 1.2 g of carbon black (DENKA BLACK, produced by Denka Company Limited), 15 g of a binder (PVdF, solid concentration 8 wt %, solution in NMP), and 8 g of NMP were mixed to prepare a slurry. Next, this slurry was applied to aluminum foil (20 μm) and then heated in a forced air oven at 80° C. for 10 minutes for solvent removal, followed by drying in vacuum at 150° for 12 hours. Finally, the workpiece was pressed with a roll press machine, whereby a positive electrode sheet was obtained.

The capacity of the obtained positive electrode was calculated from the mass per unit area of the positive electrode active material and the theoretical capacity (150 mAh/g) of the positive electrode active material. The capacity of the positive electrode was 1.2 mAh/cm$^2$.

(Preparation of Negative Electrode)

First, 12.5 g of a binder (PVdF, solid concentration 12% by mass, solution in NMP) was added to and mixed with 28.5 g of a negative electrode active material (artificial graphite) to prepare a slurry. Next, this slurry was applied to copper foil (20 μm) and then heated in a forced air oven at 80° C. for 10 minutes for solvent removal, followed by drying in vacuum at 150° for 12 hours. Finally, the workpiece was pressed with a roll press machine, whereby a negative electrode sheet was obtained.

The capacity of the obtained negative electrode was calculated from the mass per unit area of the negative electrode active material and the theoretical capacity (350 mAh/g) of the negative electrode active material. The capacity of the negative electrode was 1.4 mAh/cm$^2$.

(Production of Non-Aqueous Electrolyte Secondary Battery)

A circular piece with a diameter of 12 mm was punched out from the positive electrode sheet and used as a positive electrode. A circular piece with a diameter of 14 mm was punched out from the negative electrode sheet and used as a negative electrode.

Next, the positive electrode, the negative electrode, and a separator (polypropylene microporous film, 16 μm, diameter 16 mm) were impregnated with the electrolytic solution. The positive electrode, the separator, and the negative electrode were stacked such that the positive electrode and the negative electrode faced each other with the separator therebetween. The stack was then placed in a casing, whereby a 2032 coin battery was prepared.

Example 2

A 2032 coin battery was prepared as in Example 1 except that in (Preparation of carboxylic acid ester composition), methanol was added in an amount of 46 mass ppm and 1,1-dimethoxyethane was added in an amount of 115 mass ppm.

Example 3

A 2032 coin battery was prepared as in Example 1 except that in (Preparation of carboxylic acid ester composition), methanol was added in an amount of 92 mass ppm and 1,1-dimethoxyethane was added in an amount of 115 mass ppm.

Example 4

A 2032 coin battery was prepared as in Example 1 except that in (Preparation of carboxylic acid ester composition), methanol was added in an amount of 180 mass ppm and 1,1-dimethoxyethane was added in an amount of 90 mass ppm.

Example 5

A 2032 coin battery was prepared as in Example 1 except that in (Preparation of carboxylic acid ester composition), methanol was added in an amount of 360 mass ppm and 1,1-dimethoxyethane was added in an amount of 90 mass ppm.

Example 6

A 2032 coin battery was prepared as in Example 3 except that in (Preparation of electrolytic solution), the solvent mixture and the carboxylic acid ester composition were mixed at a mass ratio of 8:2.

Example 7

A 2032 coin battery was prepared as in Example 1 except that in (Preparation of carboxylic acid ester composition), methanol was added in an amount of 180 mass ppm and 1,1-dimethoxyethane was added in an amount of 180 mass ppm.

Example 8

A 2032 coin battery was prepared as in Example 1 except that in (Preparation of carboxylic acid ester composition), methanol was added in an amount of 90 mass ppm and 1,1-dimethoxyethane was added in an amount of 45 mass ppm, and that in (Preparation of electrolytic solution), the obtained solvent mixture and the carboxylic acid ester composition were mixed at a mass ratio of 8:2.

Example 9

A 2032 coin battery was prepared as in Example 1 except that in (Preparation of carboxylic acid ester composition), methanol was added in an amount of 46 mass ppm and no 1,1-dimethoxyethane was added.

Example 10

A 2032 coin battery was prepared as in Example 1 except that in (Preparation of carboxylic acid ester composition), 1,1-dimethoxyethane was added in an amount of 90 mass ppm and no methanol was added.

Example 11

A 2032 coin battery was prepared as in Example 1 except that in (Preparation of carboxylic acid ester composition), methanol was added in an amount of 90 mass ppm and 1,1-dimethoxyethane was added in an amount of 180 mass ppm, and that in (Preparation of electrolytic solution), the obtained solvent mixture and the carboxylic acid ester composition were mixed at a mass ratio of 9.5:0.5.

Comparative Example 1

A 2032 coin battery was prepared as in Example 1 except that in (Preparation of electrolytic solution), the solvent mixture was used as the electrolytic solution solvent without being mixed with the carboxylic acid ester composition.

Comparative Example 2

A 2032 coin battery was prepared as in Example 1 except that in (Preparation of carboxylic acid ester composition), neither methanol nor 1,1-dimethoxyethane was added to methyl acetate.

Comparative Example 3

A 2032 coin battery was prepared as in Example 1 except that in (Preparation of carboxylic acid ester composition), methyl formate was used instead of methyl acetate, and neither methanol nor 1,1-dimethoxyethane was added to methyl formate.

Comparative Example 4

A 2032 coin battery was prepared as in Example 3 except that in (Preparation of electrolytic solution), the solvent mixture and the carboxylic acid ester composition were mixed at a mass ratio of 7:3.

<Evaluation>

The 2032 coin batteries obtained in the examples and the comparative examples were evaluated as follows. Table 1 shows the results.

(Evaluation of Rate Characteristics of 2032 Coin Battery [Non-Aqueous Electrolytic Solution Secondary Battery])

Each of the obtained 2032 coin batteries was connected to a charge and discharge tester (TOSCAT 3100, produced by Toyo System Co., Ltd.) and left to stand in a thermostat at 25° C. for 12 hours with no current flow. Next, the coin battery was subjected to constant current-constant voltage (CCCV) charging at a current of 0.2 C (charge cut-off voltage: 4.25 V, CV STOP: 3 hours or the current reaching 0.02 C, rest time after charge: 10 minutes) and constant current (CC) discharging (discharge cut-off voltage: 2.5 V, rest time after discharge: 10 minutes). This charge and discharge process was repeated three times to determine whether the coin battery functioned as a battery.

Subsequently, evaluation of rate characteristics was performed in environments of 25° C. and –10° C.

The evaluation of rate characteristics at 25° C. was as follows. The coin battery was charged by CCCV charging at a current of 0.2 C, and from the charged state, CC discharging was repeated three times at each of the currents 0.2 C, 1 C, 4 C, 8 C, and 16 C, whereby the discharge capacity at each of the discharge currents was obtained. From these discharge capacities and the following formula (1), the capacity retention was calculated.

The evaluation of rate characteristics at –10° C. was as follows. The coin battery was charged by CCCV charging at a current of 0.2 C, and from the charged state, CC discharging was repeated three times at each of the currents 1 C, 4 C, and 8 C, whereby the discharge capacity at each of the discharge currents was obtained. From these discharge capacities and the following formula (1), the capacity retention was calculated.

$$[\text{Average discharge capacity obtained at each current } (C)/\text{average discharge capacity obtained at } 0.2\ C]\times100 \tag{1}$$

TABLE 1

| | | | | Example | | | | | | |
|---|---|---|---|---|---|---|---|---|---|---|
| | | | Unit | 1 | 2 | 3 | 4 | 5 | 6 | 7 |
| Electrolytic solution composition | Hydroxy group-containing compound [A] | Type | — | Methanol | Methanol | Methanol | Methanol | Methanol | Methanol | Methanol |
| | | Amount (entire electrolytic solution) | Mass ppm | 2 | 4 | 8 | 16 | 32 | 16 | 16 |
| | | Amount (excluding electrolyte) | Mass ppm | 2.28 | 4.56 | 9.12 | 18.24 | 36.48 | 18.24 | 18.24 |
| | Ether group-containing compound [B] | Type | — | 1,1-Dimethoxyethane | 1,1-Dimethoxyethane | 1,1-Dimethoxyethane | 1,1-Dimethoxyethane | 1,1-Dimethoxyethane | 1,1-Dimethoxyethane | 1,1-Dimethoxyethane |
| | | Amount (entire electrolytic solution) | Mass ppm | 10 | 10 | 10 | 8 | 8 | 20 | 16 |
| | | Amount (excluding electrolyte) | Mass ppm | 11.4 | 11.4 | 11.4 | 9.12 | 9.12 | 22.8 | 18.24 |
| | Amount of compound [A] or compound [B] alone or total amount (entire electrolytic solution) | | Mass ppm | 12 | 14 | 18 | 24 | 40 | 36 | 32 |
| | Amount of compound [A]/amount of compound [B] (entire electrolytic solution) | | — | 0.2 | 0.4 | 0.8 | 2 | 4 | 0.8 | 1 |
| | Carboxylic acid ester | Type | — | Methyl acetate | Methyl acetate | Methyl acetate | Methyl acetate | Methyl acetate | Methyl acetate | Methyl acetate |
| | | Melting point | ° C. | –98 | –98 | –98 | –98 | –98 | –98 | –98 |
| | | Boiling | ° C. | 57.1 | 57.1 | 57.1 | 57.1 | 57.1 | 57.1 | 57.1 |

TABLE 1-continued

|  |  |  |  |  |  |  |  |  |  |
|---|---|---|---|---|---|---|---|---|---|
|  | point |  |  |  |  |  |  |  |  |
|  | Amount (entire electrolytic solution) | Mass % | 10 | 10 | 10 | 10 | 10 | 20 | 10 |
|  | Amount (excluding electrolyte) | Mass % | 11.4 | 11.4 | 11.4 | 11.4 | 11.4 | 22.8 | 11.4 |
| 25° C. evaluation | 0.2 C discharge capacity | mAh | 1.13 | 1.15 | 1.13 | 1.07 | 1.09 | 1.18 | 1.09 |
|  | Capacity retention [%] | 1 C % | 91.2 | 93.4 | 92.3 | 91.3 | 90.0 | 93.9 | 91.4 |
|  |  | 4 C % | 86.1 | 89.1 | 87.3 | 85.6 | 82.9 | 89.9 | 84.1 |
|  |  | 8 C % | 80.6 | 83.7 | 81.7 | 79.7 | 75.4 | 84.9 | 77.1 |
|  |  | 16 C % | 67.3 | 68.1 | 66.1 | 62.3 | 53.1 | 68.9 | 60.8 |
|  | Rate of decrease in capacity retention [%] | 1 C → 16 C | 26.2 | 27.1 | 28.4 | 31.7 | 41.0 | 26.6 | 33.5 |
|  |  | 8 C → 16 C | 16.5 | 18.6 | 19.1 | 21.8 | 29.5 | 18.9 | 21.1 |
| −10° C. evaluation | Capacity retention [%] | 1 C % | 87.0 | 89.0 | 86.0 | 85.0 | 82.0 | 86.0 | 83.0 |
|  |  | 4 C % | 46.7 | 49.2 | 46.1 | 45.6 | 43.3 | 46.6 | 44.4 |
|  |  | 8 C % | 26.1 | 29.2 | 27.6 | 23.2 | 23.8 | 27.4 | 25.6 |

|  |  |  |  | Example |  |  |  | Comparative Example |  |  |  |
|---|---|---|---|---|---|---|---|---|---|---|---|
|  |  |  | Unit | 8 | 9 | 10 | 11 | 1 | 2 | 3 | 4 |
| Electrolytic solution composition | Hydroxy group-containing compound [A] | Type | — | Methanol | Methanol | — | Methanol | — | — | — | Methanol |
|  |  | Amount (entire electrolytic solution) | Mass ppm | 16 | 4 | 0 | 4 | 0 | 0 | 0 | 24 |
|  |  | Amount (excluding electrolyte) | Mass ppm | 18.24 | 4.56 | 0 | 4.56 | 0 | 0 | 0 | 27.36 |
|  | Ether group-containing compound [B] | Type | — | 1,1-Dimethoxyethane | — | 1,1-Dimethoxyethane | 1,1-Dimethoxyethane | — | — | — | 1,1-Dimethoxyethane |
|  |  | Amount (entire electrolytic solution) | Mass ppm | 8 | 0 | 8 | 8 | 0 | 0 | 0 | 30 |
|  |  | Amount (excluding electrolyte) | Mass ppm | 9.12 | 0 | 9.12 | 9.12 | 0 | 0 | 0 | 34.2 |
|  | Amount of compound [A] or compound [B] alone or total amount (entire electrolytic solution) | | Mass ppm | 24 | 4 | 8 | 12 | 0 | 0 | 0 | 54 |
|  | Amount of compound [A]/amount of compound [B] (entire electrolytic solution) | | — | 2 | — | — | 0.5 | — | — | — | 0.80 |
|  | Carboxylic acid ester | Type | — | Methyl acetate | Methyl acetate | Methyl acetate | Methyl acetate | — | Methyl acetate | Methyl formate | Methyl acetate |
|  |  | Melting point | ° C. | −98 | −98 | −98 | −98 | — | −98 | −100 | −98 |
|  |  | Boiling point | ° C. | 57.1 | 57.1 | 57.1 | 57.1 | — | 57.1 | 32.5 | 57.1 |
|  |  | Amount (entire electrolytic solution) | Mass % | 20 | 10 | 10 | 5 | 0 | 10 | 10 | 30 |
|  |  | Amount (excluding electrolyte) | Mass % | 22.8 | 11.4 | 11.4 | 5.7 | 0 | 11.4 | 11.4 | 34.2 |

TABLE 1-continued

| | | | | | | | | | | |
|---|---|---|---|---|---|---|---|---|---|---|
| 25° C. eval-uation | 0.2 C discharge capacity | | mAh | 1.10 | 1.13 | 1.17 | 1.18 | 1.19 | 1.20 | 1.21 | 1.19 |
| | Capacity retention [%] | 1 C | % | 92.9 | 93.0 | 90.1 | 88.7 | 89.4 | 89.8 | 78.2 | 81.7 |
| | | 4 C | % | 88.7 | 88.9 | 84.1 | 83.8 | 80.6 | 83.6 | 58.3 | 69.1 |
| | | 8 C | % | 83.1 | 80.1 | 73.7 | 72.6 | 70.1 | 71.5 | 42.0 | 58.3 |
| | | 16 C | % | 67.3 | 64.9 | 49.7 | 47.8 | 34.5 | 42.7 | 15.2 | 35.2 |
| | Rate of decrease in capacity retention [%] | 1 C → 16 C | | 27.6 | 30.2 | 44.8 | 46.1 | 61.4 | 52.4 | 80.6 | 56.9 |
| | | 8 C → 16 C | | 19.0 | 19.0 | 32.6 | 34.2 | 50.7 | 40.3 | 63.9 | 39.6 |
| −10° C. eval-uation | Capacity retention [%] | 1 C | % | 85.0 | 88.0 | 84.0 | 83.0 | 72.5 | 76.8 | 68.6 | 71.1 |
| | | 4 C | % | 45.7 | 46.9 | 44.7 | 43.6 | 22.0 | 27.8 | 19.9 | 26.8 |
| | | 8 C | % | 27.0 | 29.1 | 22.4 | 21.1 | 10.0 | 15.7 | 8.7 | 16.2 |

The electrolytic solution according to the present invention is less likely to cause a decrease in discharge capacity even under high-current conditions and enables high capacity retention. A decrease in capacity retention is significantly small especially when comparison is made between high currents (8 C→16 C).

Moreover, the electrolytic solution enables high capacity retention not only at room temperature but also at low temperature.

INDUSTRIAL APPLICABILITY

The present invention can provide an electrolytic solution that is less likely to cause a decrease in discharge capacity even under high-current conditions and enables high capacity retention, and a non-aqueous electrolytic solution secondary battery including the electrolytic solution.

The invention claimed is:

1. An electrolytic solution comprising:
   a carboxylic acid ester;
   a hydroxy group-containing compound; and
   an ether group-containing compound,
   the electrolytic solution comprising the hydroxy group-containing compound and the ether group-containing compound in a total amount of 50 ppm or less and having a mass ratio of the hydroxy group-containing compound to the ether group-containing compound of 0.1 or greater and 10 or less,
   wherein the carboxylic acid ester has a structure represented by the general formula R—COOR' wherein R represents a hydrogen atom or a C1-C10 linear or branched hydrocarbon group, and R' represents a C1-C10 linear or branched hydrocarbon group,
   the hydroxy group-containing compound is a primary alcohol, and
   the ether group-containing compound contains a diether compound.

2. The electrolytic solution according to claim 1, wherein the amount of the carboxylic acid ester is 3% by mass or greater and 40% by mass or less.

3. The electrolytic solution according to claim 1, wherein the diether compound has a carbon number of 3 or greater and 10 or less.

4. The electrolytic solution according to claim 1, wherein the diether compound has a structure in which two ether groups bind to the same carbon.

5. A non-aqueous electrolytic solution secondary battery comprising the electrolytic solution according to claim 1.

\* \* \* \* \*